United States Patent [19]

Zwicker

[11] Patent Number: 4,679,582

[45] Date of Patent: Jul. 14, 1987

[54] GAS PRESSURE REDUCING REGULATOR

[75] Inventor: Roger D. Zwicker, Arlington, Tex.

[73] Assignee: Victor Equipment Company, Denton, Tex.

[21] Appl. No.: 861,504

[22] Filed: May 9, 1986

[51] Int. Cl.[4] .............................................. F16K 17/14
[52] U.S. Cl. .................................. 137/71; 137/505.39; 137/505.42; 92/101
[58] Field of Search ............... 137/505, 505.39, 505.42, 137/71; 92/101; 251/368

[56] References Cited

U.S. PATENT DOCUMENTS

| 2,049,382 | 7/1936 | Deming | 137/505.42 |
| 2,152,781 | 4/1939 | Wile | 137/505.42 |
| 3,088,486 | 5/1963 | Salmon | 137/505.42 X |
| 3,234,960 | 2/1966 | Brumm | 137/505.42 X |
| 3,521,669 | 7/1970 | Suchowolec | 137/613 X |
| 3,777,783 | 12/1973 | Beck | 251/368 X |
| 3,812,877 | 5/1974 | Fleischhacker | 137/505.42 |
| 4,516,595 | 5/1985 | Acomb | 137/505.42 X |

FOREIGN PATENT DOCUMENTS 741197  2/1933  France ........................... 137/505.42

*Primary Examiner*—Harold W. Weakley
*Attorney, Agent, or Firm*—Majestic, Gallagher, Parsons & Siebert

[57] ABSTRACT

A gas pressure reducing regulator for use with high inlet pressures is provided. The regulator includes a diaphragm plate for shielding the diaphragm from deleterious effects of flame and debris during unwanted combustion.

7 Claims, 4 Drawing Figures

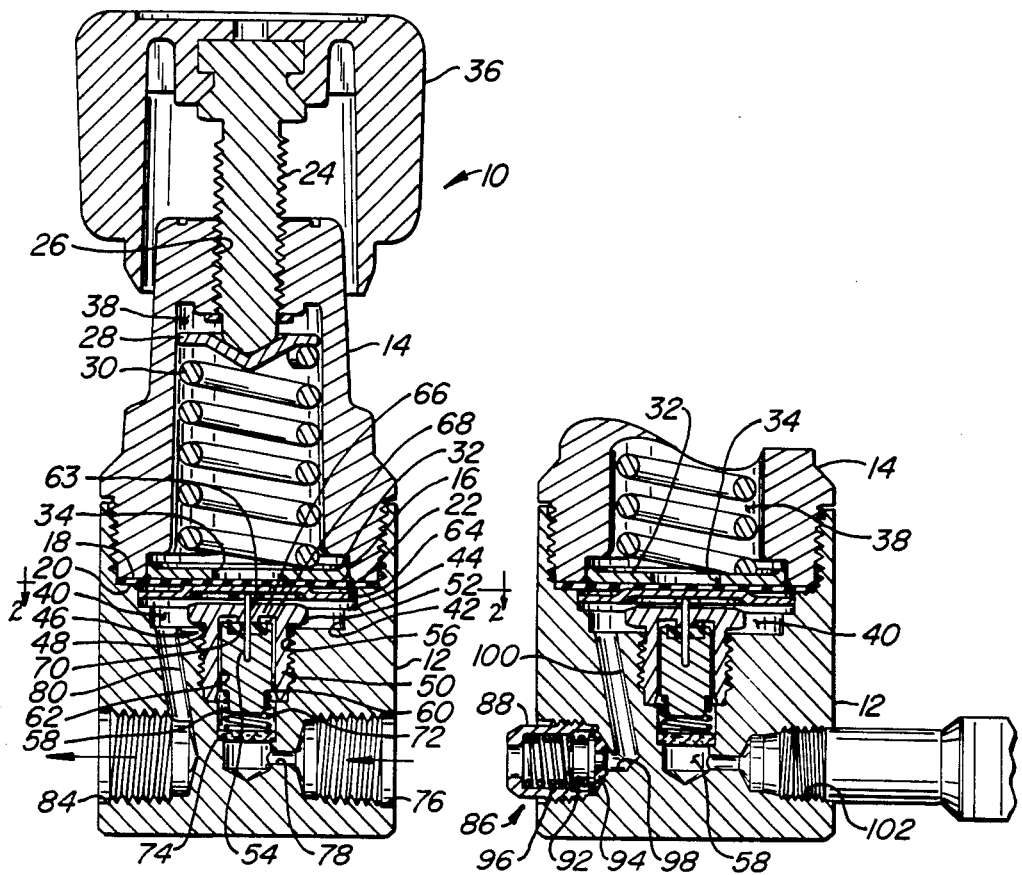
FIG._1A.   FIG._1B.
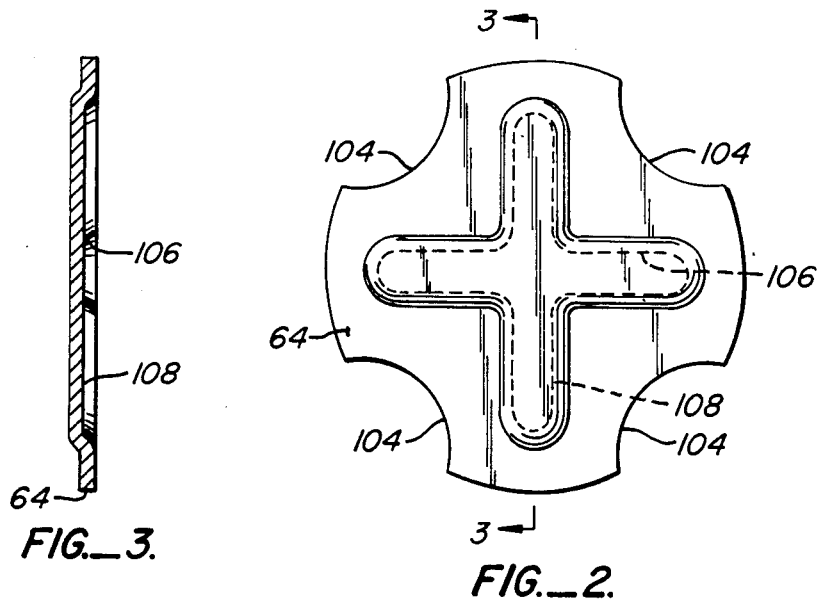
FIG._3.   FIG._2.

GAS PRESSURE REDUCING REGULATOR

BACKGROUND OF THE INVENTION

1. Field of the Invention

This invention relates to gas pressure reducing regulators. More particularly, it relates to regulators for reducing pressure of a compressed gas, such as oxygen, contained in cylinders to a working pressure level.

2. Description of the Prior Art

Gas pressure reducing regulators for reducing high pressure gas to low pressure for various applications have been known and used for many years. In addition to cutting and welding applications, such regulators are used in the medical field where for regulating gases such as oxygen which are administered to patients. Two problems associated with such regulators are burn-through and explosion. Regulator burn-through occurs when the regulator body and/or component materials are ignited and burn in the presence of oxygen or other oxidizer present within the regulator body. This burn-through is characterized by the burning through the outer walls of the regulator and a subsequent melting away of the regulator. This is often accompanied by sparks and flame.

With explosion, the detonation of gases and other flammables such as lubricant present within the regulator body occurs. If the housing does not contain the explosion, it will fragment sending shrapnel-like pieces in many directions. Either burn-out or explosion represent a serious safety hazard to those within the environment of such a regulator and could be especially damaging in hospital environments where patients and medical personnel are present.

The ignition which triggers burn-through or explosion may be caused in several ways. One way is thought to be adiabatic compression of the gases within the regulator body. The second possibility is the entrance into the regulator body of sparks from other sources. Whatever the cause of this safety problem, it does occur with sometimes disastrous results.

Various attempts have been made to produce a regulator that is resistant to burn-through and explosion. One such regulator design is shown in U.S. Pat. No. 4,450,858. Another is shown in U.S. Pat. No. 4,489,751. However, these prior art devices have not been entirely satisfactory.

SUMMARY AND OBJECTS OF THE INVENTION

For example, the last mentioned prior art patent device includes a diaphragm shield which is fixed to and travels with the diaphragm. However, this affixation requires that a fastener be passed through the diaphragm which may weaken it and provide a leakage path for flame and other combustion. Both of the above prior art devices are relatively complex in their construction requiring additional parts which consequently makes them more costly to produce.

The present invention takes the form of a high pressure gas regulator having a high pressure gas inlet and a low pressure gas outlet. Located between the upper and lower parts of the body is a diaphragm. The diaphragm is contained between a spring plate which presses against the diaphragm on one side by means of a spring plate and a diaphragm member which is located in the low pressure chamber. Motion of the diaphragm and adjacent diaphragm plate is transmitted to the valve poppet by a valve stem.

High and low pressure chambers within the body are dimensioned so as to provide a minimum of gas volume therein. High pressure gas passes from an inlet through an inlet passage to a valve core assembly which is axially positioned within the body. When the poppet in the valve core assembly is unseated by means of the diaphragm plate pushing against a stem of the valve poppet, high pressure gas is released. This high pressure gas passes around a lip and seal of the valve core body and vents through a generally axial and subsequentially radial passage within the valve body. Before entering the axial passage, the gas is directed radially outwardly by four formed grooves in the diaphragm plate. By dimensioning the diaphragm plate to substantially fill the space between the walls of the low pressure chamber, excepting for four notches located in its periphery, the diaphragm will be shielded from any flame within the chamber. In this manner, burn through or puncture of the diaphragm by loose particles will be minimized. The gas then passes out through an outlet port.

This construction also advantageously provides a minimum volume of gas in the low pressure chamber adjacent the diaphragm, which may be of thin metal material. This will tend to minimize the force of any explosion since a lesser amount of combustible gas will be present than with conventional regulators. In addition, the passage of gas at various sharp angles tends to cut off propagation of flame within the body. Also tending to cut off flame propagation are the provision of small apertures for passage of gas.

Still further, the body and various components are made of thick, heat absorptive metal material which tends to resist and quench flame, as well as to contain explosive forces. Ideally, the regulator is constructed so as to maximize mass and minimize surface area in contact with the gas. In this manner, any flame front will be presented with large, ignition resistent mass as opposed to thin flammable components such as neoprene "O" rings and seals.

It is therefore a primary object of the invention to provide an improved gas pressure regulator which resists burnout and explosion.

It is a further object to provide such a gas pressure regulator constructed so as to minimize gas chamber volume and thereby reduce the volume of gas therein that is available for unwanted combustion.

It is a still further object of this invention to provide a gas pressure regulator having a protective diaphragm plate therein which screens the diaphragm from flame and debris during unwanted combustion and thereby minimized burnthrough of the diaphragm.

It is a still further object of this invention to provide a regulator having a diaphragm plate with formed channels therein allowing gas pressure to be sensed by while at the same time protecting the diaphragm.

It is a still further object of this invention to provide a gas pressure regulator having a diaphragm which ruptures so as to relieve excessive gas pressure to atmosphere.

Further and other objects and advantages of this invention will become apparent from the following detailed description when read in conjunction with the accompanying drawings.

BRIEF DESCRIPTION OF THE DRAWINGS

FIG. 1A is a side elevational cross sectional view of the inventive gas regulator;

FIG. 1B is a partial rear elevational cross sectional view of the same;

FIG. 2 is a plan view of the diaphragm plate taken along lines 2—2 in FIG. 1A; and FIG. 3 is a side cross sectional view of the diaphragm plate of FIG. 2 taken along lines 3—3.

DESCRIPTION OF THE PREFERRED EMBODIMENT

In FIG. 1A there is illustrated the gas pressure regulator of the instant invention in cross section. The regulator shown generally at 10 consists of two main subassemblies, being a lower body 12 and an upper top or spring housing cap 14. Top 14 is threadably secured to body 12 by means of threads 16. Also secured within the body is a diaphragm 18 of circular shape. The material of this diaphragm may conveniently be of cloth-reinforced elastomer or of stainless steel. As may be seen, the diaphragm is retained around its periphery by means of a forward annular wall 20 of the cap 14 being screwed down onto a corresponding inner annular wall 22 within the open end of lower body 12.

An adjusting screw 24 is threadedly received with an axial bore 26 within cap 14. The adjusting screw presses against a compression plate 28 which, in turn, contains a spring 30 between itself and a bottom spring plate 32. The spring plate has a centrally disposed aperture 34 therethrough for a purpose that will be hereinafter described. A knob 36 is fixed to the free end of adjusting screw 24 for manual operation thereof.

An ambient air chamber 38 is provided within top 14. Vent holes (not shown) equalize the pressure within the regulator top 14 with ambient pressure. In this manner, the outlet pressure in low pressure chamber 40 is true gauge pressure, being compensated for by changing atmospheric pressure.

As shown, low pressure chamber 40 is defined by a pair of axial, stepped bores 42, 44 in lower body 12. Diaphragm 18 closes off these bores so as to complete the low pressure chamber. A valve core assembly 46 is contained within body 12. The valve core assembly 46 consists of a core body 48 having a lower shaft portion 50 and an upper head portion 52. An extension rod stem 54 extends from the head 52 of core assembly 46 as will be more fully described hereinafter.

The core assembly 46 is threadably secured within an axial bore 56 in the body 12. Bore 56 forms a high pressure chamber 58 within the lower portion of body 12. A slidable poppet 60 of generally cylindrical shape is contained within a bore 62 in lower shaft portion 50. The upper end of extension rod stem 64 passes through an axial bore 63 in head portion 52 and contacts the center of a diaphragm plate 64 which is located in contacting relation with diaphragm 18. The material of said diaphragm plate should be of a non-ferrous material such as brass or any copper bearing alloy to resist combustion in oxygen atmosphere. An annular seal 66 of elastomeric material is inset within a bore 68 in the upper end of poppet 60 and seals against an annular lip 70 within head 52.

A return spring 72 contained between poppet 60 and filter 74 causes the flow of gas from high pressure inlet 76 through inlet passage 78 and thence high pressure chamber 58, to be cut off by means of the interaction between an annular lip 70 and annular seal 66.

Gas flowing around lip 70 and seal 66 through axial bore 63 and diaphragm plate 64 passes into high pressure chamber 40. From there, the gas passes into a pair of intersecting outlet passages 80, 82 and thence into low pressure outlet 84.

As seen in FIG. 1B, a relief valve shown generally at 86 is provided for venting overpressure conditions such as pressure surges to ambient surrounds. The relief valve consists of a hollow valve housing 88 which is threadedly engaged in a relief valve port 90 in the side of valve housing 12.

The relief valve includes a valve poppet 92 having an "O"-ring seal mounted on one end thereof. The relief valve poppet 92 is spring biased by means of a valve spring 96 contained within the housing. Intersecting valve passages 98, 100 allow pressure in high pressure chamber 40 to be sensed by the relief valve and to be actuated when an overpressure condition occurs.

Very large overpressure conditions higher than the capacity of the relief valve are also taken care of by the diaphragm 18 acting as a burst diaphragm. This is facilitated by means of aperture 34 in spring plate 32 which allows diaphragm 18 to burst into chamber 38. Pressure is then relieved to the ambient surrounds through vents (not shown) in cap 14.

A pressure gauge port 102 is located in the valve body 12 opposite to relief valve port 90 for sensing pressure in high pressure chamber 58.

Turning to FIG. 2, it may be seen that diaphragm plate 64 is of generally circular shape having four circular notches 104 equally spaced around the periphery thereof. Intersecting cross passages 106, 108 are formed in diaphragm plate at an orientation 45° rotated from the notches 104.

In operation and as best seen in FIG. 1A, the regulator 10 is connected to a high pressure cylinder (not shown) by way of high pressure inlet 76. With zero pressure set by adjusting screw 24, spring 72 in chamber 58 forces poppet upward to engage resilient seal 66 with lip 70 so as to prevent flow of high pressure fluid thereby.

When adjusting screw 24 is moved downwardly as by turning in a clockwise direction, it applies pressure to spring 30 and thence to bottom spring plate 32. This, in turn, moves diaphragm 18 and diaphragm plate 64 downwardly against stem 54. Stem 54 forces poppet downward against the force of return spring 72 so as to unseat the seal 66 from lip 70. In this manner, gas is allowed to flow from high pressure chamber 58 around poppet 60. It then flows through axial bore 68 and thence out grooves 106, 108 in diaphragm plate 64. The gas then flows through low pressure chamber 40 and into outlet passages 80, 82 and low pressure outlet 84. As pressure increases in low pressure chamber 40, the pressure acting on diaphragm 18 counterbalances the force of spring 30 and moves it in an upward direction. This allows return spring 72 to force seal 66 against lip 70, thereby cutting off flow from high pressure chamber 58. In this way, effects of varying inlet pressures are mitigated, and essentially constant pressure is maintained in low pressure chamber 40 regardless of inlet pressure.

Once the device receiving fluid from low pressure outlet 84 begins to operate, pressure decreases in low pressure chamber 40. This unbalances the force opposing spring 30, and stem 54 is then depressed by means of diaphragm plate 64 acting through diaphragm 18 so as to again depress poppet 60 and seal 66 away from lip 70. When pressures are again equalized, the poppet will again close.

It may be noted that diaphragm plate 64 substantially shields diaphragm 18 from flame or debris that might occur during a regulator burnout condition. Other than the openings provided by notches 104 (see FIG. 2) in diaphragm plate 64, there is very little possibility of deleterious flame and debris contacting diaphragm 18. This is due to diaphragm 18 being dimensioned to be of a diameter only slightly smaller than the low pressure chamber diameter and notches 104 being located at the outer periphery of the diaphragm plate.

It is to be understood that while the invention has been described above in conjunction with the preferred specific embodiment thereof, that the description is intended to illustrate and not limit the scope of the invention, which is defined by the scope of the appended claims.

I claim:

1. A gas pressure regulator for reducing high inlet gas pressure from a source to low outlet gas pressure comprising:
   a. a body having an inlet for communication with a high pressure gas source and an outlet for communication with a low pressure application;
   b. a cap on said body defining an ambient air chamber therein;
   c. a diaphragm intermediate said cap and body and sealed therebetween;
   d. a low pressure chamber defining a lateral wall in said body communicating with said diaphragm;
   e. a high pressure chamber in said body communicating with said inlet;
   f. a valve assembly disposed between said high pressure chamber and an outlet passage communicating with said outlet, said valve assembly being operable from a closed position to cut off flow from said inlet and from an open position wherein such flow is allowed from said inlet to said outlet; and
   g. a diaphragm plate located intermediate said diaphragm and said valve assembly, said diaphragm plate being in contacting relation with said diaphragm and movable therewith but being otherwise free of attachment to said diaphragm, said diaphragm plate being dimensioned so as to substantially extend between said lateral wall,
   h. means defining at least one opening in said diaphragm plate whereby pressure on the side of said diaphragm plate opposite said valve assembly is communicated to the opposite side of said diaphragm plate and thence to said diaphragm,
   i. means defining grooves in said diaphragm plate extending from the center of said plate to a point adjacent to the periphery thereof, said grooves being adapted for directing gas from said valve assembly to said outlet,
   j. a spring plate located intermediate said ambient chamber and said diaphragm, said spring plate being in contracting relation with said diaphragm and having a centrally disposed aperture therein so as to permit said diaphragm to expand into said ambient chamber through said aperture to burst when a very large overpressure condition occurs in said high pressure chamber.

2. The invention of claim 1 wherein the number of said passages in said diaphragm plate is four, said passages being located at right angles to each other.

3. The invention of claim 2 wherein the number of said openings is four, said openings being located equidistant between said passages.

4. The invention of claim 3 wherein said openings are semicircular in shape.

5. The invention of claim 1 wherein said diaphragm is free of discontinuities and openings.

6. The invention of claim 1 wherein said diaphragm is of generally circular shape.

7. The invention of claim 1 wherein the material of said diaphragm plate is of a non-ferrous material.

* * * * *

UNITED STATES PATENT AND TRADEMARK OFFICE
CERTIFICATE OF CORRECTION

PATENT NO. : 4,679,582

DATED : July 14, 1987

INVENTOR(S) : Roger D. Zwicker

It is certified that error appears in the above-identified patent and that said Letters Patent is hereby corrected as shown below:

Column 6, line 22: "contracting" should be --contacting--.

Signed and Sealed this

Twenty-seventh Day of October, 1987

Attest:

DONALD J. QUIGG

Attesting Officer — Commissioner of Patents and Trademarks